Patented Dec. 12, 1939

2,182,860

UNITED STATES PATENT OFFICE 2,182,860

CATHODE RAY TUBE FLUORESCENT SCREEN

Nicolaas Willem Hendrik Addink and Jan Hendrik de Boer, Eindhoven, Netherlands, assignors, by mesne assignments, to Radio Corporation of America, New York, N. Y., a corporation of Delaware No Drawing. Application April 14, 1937, Serial No. 136,786. In the Netherlands April 14, 1936

1 Claim. (Cl. 250—164)

This invention relates to an electric discharge tube comprising a fluorescent screen, such as a cathode ray tube and the like.

In such tubes it is known to use substances fluorescing in different colors. It being advantageous, however, to use screens giving a white fluorescence, such screens for this purpose have been proposed in which zinc cadmium sulfide is used for the component giving a red luminescence mixed with a sulphide or sulphides having bluish or greenish color under electronic bombardment. However, these screens suffer from the drawback that sulphur is set free from the sulphides during operation of the tube, which may give rise to poisoning of the oxide cathode and to a decreased life of the tube.

We have now found that this defect can be avoided by using a discharge tube according to the present invention. This tube comprises a fluorescent screen with a fluorescing substance consisting of two or more metal salts containing anions, which do not yield any gas or vapour even when they are struck by electrons and of which one of the constituents gives a red or orange-red fluorescence.

Indeed we have found that in order to obtain a suitable screen giving a white fluorescence, a red luminescing component must be used. For this purpose, materials such as magnesium silicate, ruby (synthetic or natural), or magnesium germanate are preferably used.

The luminescent substance for a screen of a tube according to the invention may, for example, consist of a mixture of cadmium tungstate and magnesium silicate. Instead of cadmium tungstate as one of the ingredients of the mixture, in addition to the red luminescing component, it is also possible to use substances such as calcium tungstate and zinc silicate.

It is to be understood that the screen is to be made by a mixture of the material rather than a chemical combination of them and the exact proportion may be varied between the component compounds to give the desired hue of white to fit given conditions.

The application of the mixture of the component compounds to the glass end wall of the tube may be effected through the use of spraying of a suspension, or by use of a settling solution, or by use of a binder or adhesive depending upon the requirements of maximum efficiency or maximum robustness to jars and shaking.

Having described our invention what we claim is:

A luminescent screen comprising a mixture of cadmium tungstate and magnesium silicate, said mixture emitting white light under the impact of a beam of electrons, the spectral emission being substantially invariant with respect to the velocity of the impacting electrons.

NICOLAAS WILLEM HENDRIK ADDINK.
JAN HENDRIK DE BOER.